US012592912B2

(12) United States Patent
Kwakkel et al.

(10) Patent No.: US 12,592,912 B2
(45) Date of Patent: Mar. 31, 2026

(54) NETWORK SEGMENTATION FOR SECURE NETWORK TUNNELING

(71) Applicant: Fortanix, Inc., Santa Clara, CA (US)

(72) Inventors: Gijsbrecht Natanaël Kwakkel, Lienden (NL); Jethro Gideon Beekman, Eindhoven (NL)

(73) Assignee: Fortanix, Inc., Santa Clara, CA (US)

( * ) Notice: Subject to any disclaimer, the term of this patent is extended or adjusted under 35 U.S.C. 154(b) by 26 days.

(21) Appl. No.: 18/883,271

(22) Filed: Sep. 12, 2024

(65) Prior Publication Data

US 2026/0075038 A1     Mar. 12, 2026

(51) Int. Cl.
H04L 9/40          (2022.01)
H04L 9/32          (2006.01)
(52) U.S. Cl.
CPC ........ H04L 63/0272 (2013.01); H04L 9/3247 (2013.01)
(58) Field of Classification Search
CPC .......................... H04L 63/0272; H04L 9/3247
See application file for complete search history.

(56) References Cited

U.S. PATENT DOCUMENTS

| | | | | |
|---|---|---|---|---|
| 8,776,209 B1 * | 7/2014 | Kumar | ................ | H04L 63/0815 |
| | | | | 709/225 |
| 2009/0025080 A1 * | 1/2009 | Lund | ..................... | H04L 63/166 |
| | | | | 726/15 |
| 2009/0328192 A1 * | 12/2009 | Yang | ..................... | H04L 63/168 |
| | | | | 715/810 |
| 2021/0314339 A1 * | 10/2021 | Tsarfati | ................... | G06F 21/57 |
| 2023/0171263 A1 * | 6/2023 | Pabijanskas | ........ | H04L 63/0428 |
| | | | | 713/168 |
| 2024/0406027 A1 * | 12/2024 | Fray | .................... | H04L 12/4633 |

* cited by examiner

*Primary Examiner* — Nicholas R Taylor
(74) *Attorney, Agent, or Firm* — Lowenstein Sandler LLP

(57)          ABSTRACT

A request of a VPN client to connect to a second set of one or more networks is received by a first VPN server associated with a first set of one or more networks. The request comprises an identifier of the VPN client, an attestation of an access control server that the VPN client complies with a compliance profile required to access the second set of one or more networks, and a digital signature of the access control server. The digital signature is validated using a public key of the access control server. One or more common networks each included in both the first and second sets of networks are identified. A firewall of the first VPN server is modified to permit the VPN client to connect to the one or more common networks.

20 Claims, 6 Drawing Sheets

300

400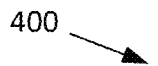

RECEIVE, BY 1ST VPN SERVER FOR 1ST SET OF NETWORK(S), A REQUEST OF A VPN CLIENT TO CONNECT TO 2ND SET OF NETWORK(S), INCLUDING: (I) AN IDENTIFIER OF THE VPN CLIENT, (II) AN ATTESTATION OF COMPLIANCE, (III) A DIGITAL SIGNATURE OF ACCESS CONTROL SERVER 402

VALIDATE THE DIGITAL SIGNATURE 404

IDENTIFY ONE OR MORE COMMON NETWORK(S) FOR 1ST SET OF NETWORK(S) AND 2ND SECOND SET OF NETWORK(S) 406

MODIFY A FIREWALL OF 1ST VPN SERVER TO PERMIT THE VPN CLIENT TO CONNECT TO THE COMMON NETWORK(S) 408

MODIFY THE FIREWALL OF 1ST VPN SERVER TO BLOCK THE VPN CLIENT FROM CONNECTING TO NETWORK(S) OF 1ST SET OF NETWORK(S) THAT ARE NOT IN 2ND SET OF NETWORKS 410

FIG. 4

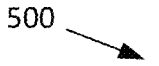
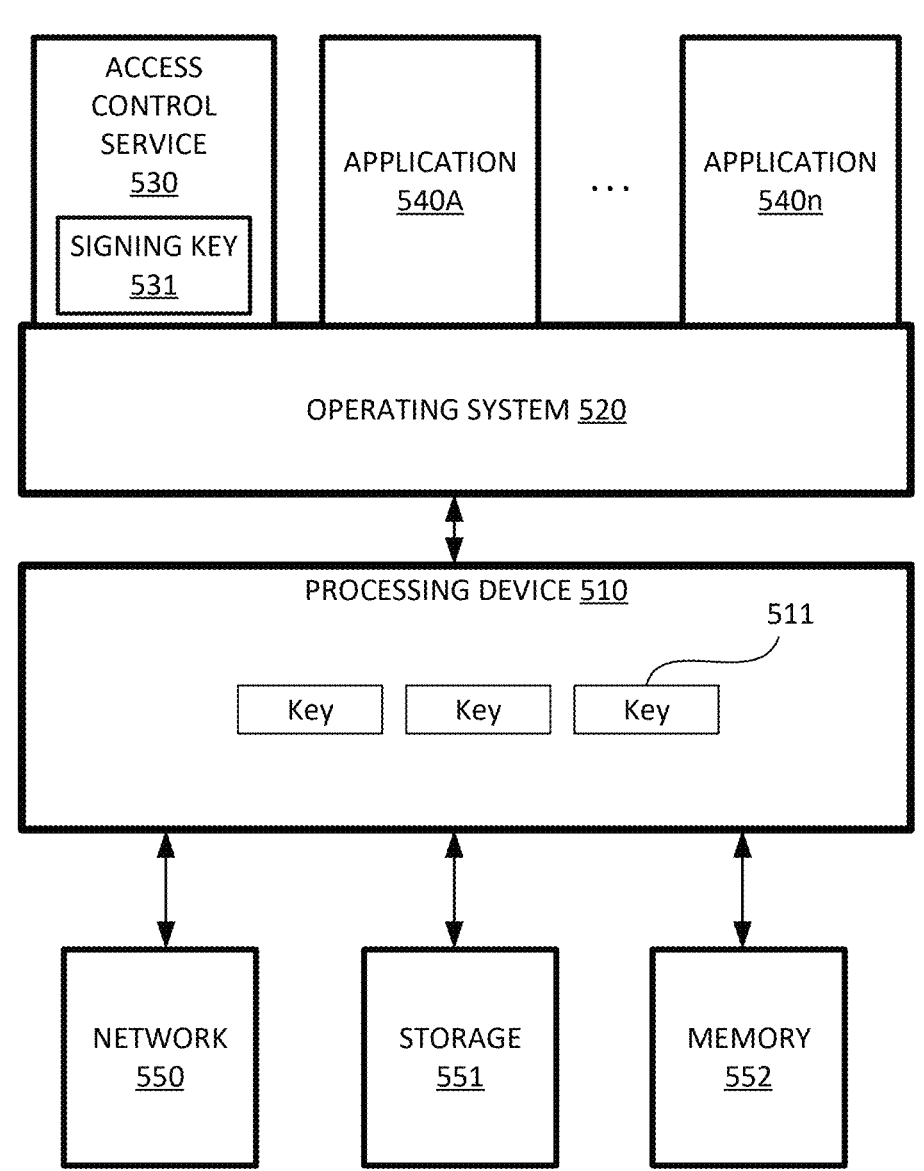
FIG. 5

NETWORK SEGMENTATION FOR SECURE NETWORK TUNNELING

TECHNICAL FIELD

Aspects and embodiments of the present disclosure relate to network services, and in particular to network segmentation for secure network tunneling.

BACKGROUND

Network tunneling enables transport of payload packets over one or more carrier networks, which may not be suitable to carry the payload packed directly. The payload packets may be encapsulated in carrier packets conforming to a network protocol of the carrier networks, which may then be transmitted across the carrier networks to a destination endpoint. At the destination endpoint, the payload packets may be decapsulated (extracted) from the carrier packets. Network tunneling may thus provide an abstraction of a single local network connecting two endpoints, which in reality may span various public and private carrier networks across great geographical distances. Network tunneling may further provide security and integrity for payload packets by performing various cryptographic operations (e.g., encryption and decryption) when encapsulating and decapsulating the payload packets.

BRIEF DESCRIPTION OF DRAWINGS

Various embodiments in accordance with the present disclosure will be described with reference to the drawings, in which:

FIG. 4 is a flow diagram of an example method for providing network segmentation for secure network tunneling, in accordance with an embodiment;

FIG. 5 illustrates an example network server having an access control service for providing network segmentation for secure network tunneling, in accordance with an embodiment.

DETAILED DESCRIPTION

Figure 1:
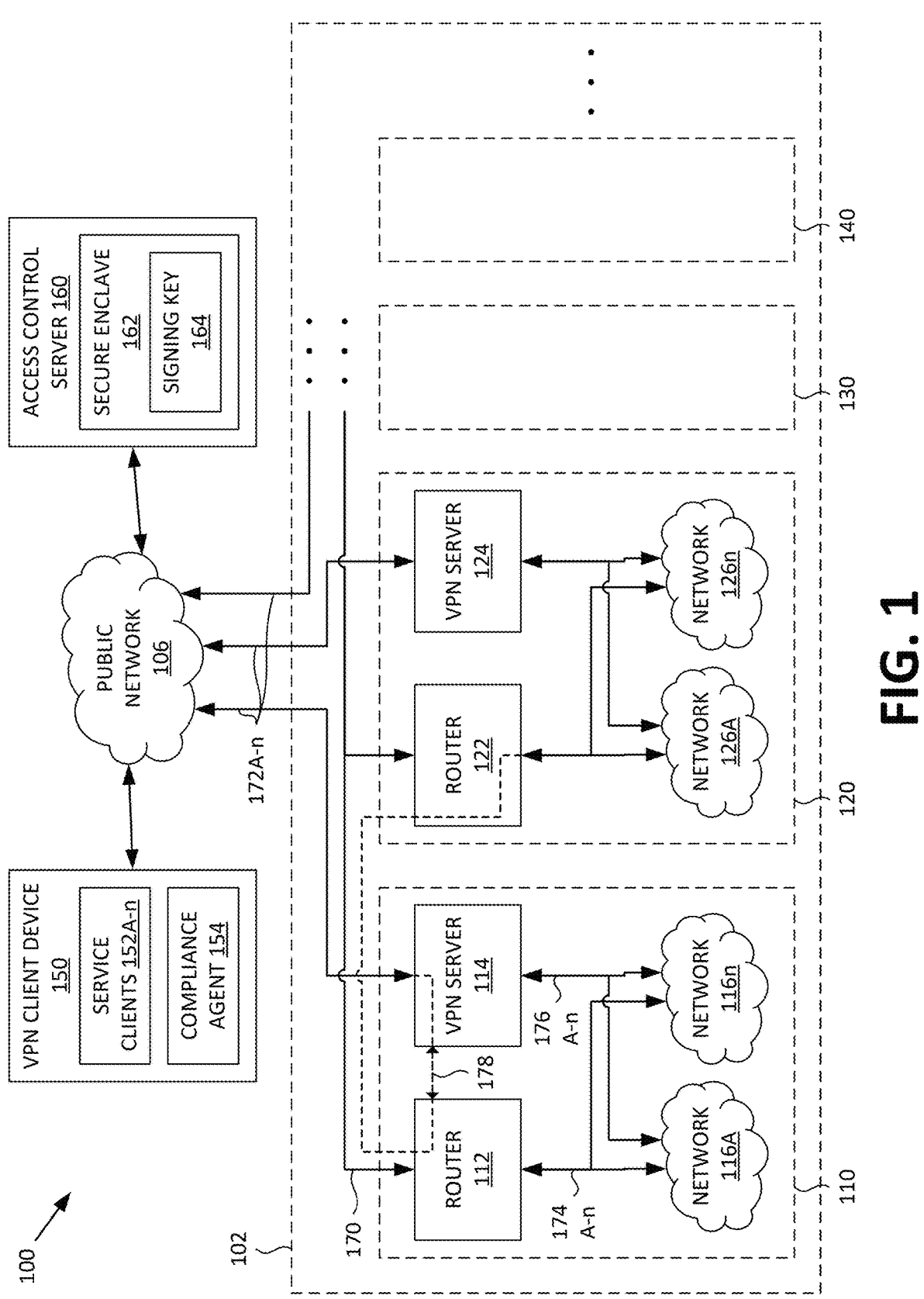
FIG. 1 is a block diagram of an example system architecture for providing network segmentation for secure network tunneling, in accordance with an embodiment.

Aspects of the present disclosure relate to network segmentation for secure network tunneling. Network tunneling enables transport of payload packets over one or more carrier networks, which may not be suitable to carry the payload packed directly. The payload packets may be encapsulated in carrier packets conforming to a network protocol of the carrier networks, which may then be transmitted across the carrier networks to a destination endpoint. At the destination endpoint, the payload packets may be decapsulated (extracted) from the carrier packets. Network tunneling may thus provide an abstraction of a single local network connecting two endpoints, which in reality may span various public and private carrier networks across great geographical distances. Network tunneling may further provide security and integrity for payload packets by performing various cryptographic operations (e.g., encryption and decryption) when encapsulating and decapsulating the payload packets. Network tunneling may be useful, for example, for establishing a virtual private network (VPN)-a secure connection between two endpoints (which may be, e.g., individual computers or whole networks) over a public network such as the Internet. Various protocols that may be used for VPNs and network tunneling include, for example, Internet Protocol Security (IPsec) Transport Layer Security (SSL/TLS), WireGuard, and others.

A private network may refer to a network exclusive to a specific group of users (e.g., an entity) or configured for a specific purpose(s). Private networks may include multiple nodes (e.g., computers) connected together via network switches, routers, and other network infrastructure. Private networks may range from local area networks (LANs) connecting a few nodes in a small geographic region to globe-spanning networks of networks connected together by tunneling protocols such as those described above, the Border Gateway Protocol (BGP), and other protocols and techniques. A public network may refer to a network accessible to various users and supportive of various purposes. In an example of a private network, an entity such as an enterprise may provision servers in multiple data centers spread across multiple countries or continents. The servers in an individual data center may form a LAN with a collocated router, and the LANs of the various data centers may in turn be connected via BGP or tunnels over a public network (e.g., the Internet) to form the entity's private network. Private networks may restrict which external nodes (or users associated with external nodes) are permitted to access the network and may provide or enforce secure protocols for communication over public networks such as the Internet. Continuing the enterprise example above, a user such as an employee may be permitted to connect their personal computer (an external node) to the enterprise's global private network by tunneling over the Internet via a VPN endpoint of the private network if the employee's computer provides appropriate authentication and encrypts packets with the required secure protocols. If successful, the employee's computer would become a node in the private network and could send or receive packets to or from any other routable node within the private network. In this example, the VPN endpoint of the private network may be referred to as a VPN server and the employee's computer as a VPN client, reflecting the roles of authenticator and authenticated, respectively. In other examples, the roles of server and client VPN endpoints may be reversed, or server and client VPN endpoints may each perform both roles simultaneously.

The above-described systems may face several challenges related to controlling external node access to private networks and maintaining security and stability of private networks. In some scenarios, a private network may provide a limited number of endpoints for external nodes to connect to the private network via VPN or similar techniques. This configuration may be referred to as a "hub and spoke" configuration, where a single endpoint hub is the bottleneck through which external nodes must pass to connect to the spoke nodes within the private network. For example, the enterprise mentioned above may have a private network connecting nodes in the United States, Europe, and Asia (e.g., spokes), and a VPN server in Europe (e.g., a hub) for connecting employee users to the whole private network. An employee in the U.S. wanting to access an enterprise node that is also located in (or serving) the U.S. may have to connect through the VPN server in Europe, which would potentially cause the employee to experience excessive latency due to the round trip between continents. Furthermore, should the VPN server in Europe go offline (e.g., due to a network or data center outage), the entirety of the private network would be inaccessible to the employee(s). Similarly, a BGP route leak (e.g., due to an ISP or other autonomous system) may cause some nodes of the private network to be unrouteable from the VPN server hub. Such events may be accidental or malicious.

In some scenarios, a private network may restrict external node access to areas of the private network, such as geographic regions, subnets, or services. Continuing the example above, an employee's computer may have been granted access to only the nodes in the U.S. When connecting to the VPN server in Europe, the network infrastructure (e.g., firewalls, routing tables, etc.) may attempt to ensure that the employee can only route to the nodes in the U.S. subnet. However, accidental misconfigurations of complex network architectures or unanticipated access scenarios may result in an external node being able to route to areas of the private network for which they do not have permission (e.g., Europe or Asia in the example). Furthermore, malicious activity by the external node may result in the external node gaining access to other areas of the network.

As a result of these and other challenges, entities associated with private networks and users of those private networks may experience increased latency, increased exposure to network attacks, more frequent network interruptions and downtime, non-compliance with various security requirements, increased operational costs, and other inconveniences.

Aspects of the present disclosure address the above and other deficiencies by providing network segmentation for secure network tunneling. In an embodiment, a private network may be subdivided into multiple subnetworks. For example, different regions covered by the private network may each include one or more subnets. Subnets in one region may be connected to subnets in another region through routers of the private network (e.g., using BGP, tunneling, etc.). The private network may further include multiple tunneling endpoints, such as VPN servers, each dedicated to a specific region. A tunneling endpoint in one region may be connected to one or more subnets in the same region but may have no connection to subnets in other regions. An external node (e.g., a user's computer or other VPN client) connecting to the private network through a tunneling endpoint in a specific region may thus be limited to routing to the subnets in that region. In an embodiment, a high-availability route between a tunneling endpoint in one region and subnets in a second region may be established via the routing infrastructure of the private network (e.g., via BGP routes) if the local tunneling endpoint in the second region becomes unavailable.

In an embodiment, an external node may communicate with an access control server to obtain authentication information that may be used to access the private network via a tunneling endpoint. The access control server may be an intermediary that is trusted by the private network to attest to the external node's identity, integrity, access level, and other compliance information relevant to authentication. The access level information may include which subnets of the private network the external node has permission to access. The external node may participate in a protocol with the access control server to establish the above compliance information to the access control server's satisfaction. The access control server may then generate and sign a certificate attesting to the above compliance information and provide the certificate to the external node. The external node may provide the certificate to the tunneling endpoint to request access to the private network. The tunneling endpoint may validate the certificate using a public key of the access control server (e.g., which may be signed by another trusted certificate authority). The tunneling endpoint may compare the subnets that the external node has permission to access and the subnets that are connected to the tunneling endpoint and grant the external node access to the common subnets (e.g., by configuring VPN and firewall settings). The grant may be for a limited period of time, after which the certificate may expire, and access may be revoked if a new certificate signed by the access control server is not provided. If the new certificate indicates a change in compliance (e.g., a change in access level), the tunneling endpoint may change which subnets the external node is permitted to access. Thus, the tunneling endpoint may ensure that the external node remains in compliance with access requirements at appropriate intervals (e.g., periodically) throughout the connection lifetime. The access certificates provided by the external node may further be used for other purposes on the private network, such as for granting access to services hosted within the private network (e.g., SSH).

Accordingly, systems using the techniques described herein can provide network segmentation and access control for secure network tunneling that enables subnets of a private network to be isolated from each other and serviced by dedicated tunneling endpoints, each of which may provide fine-grained access to external nodes based on certificates provided by an access control server. The advantages of the disclosed embodiments include but are not limited to reduced exposure of private networks to networks attacks (e.g., from users or third parties) and improved redundancy against network interruptions and other sources of downtime. Users of private networks may experience decreased latency when connecting to a tunneling endpoint and seamless transitioning to alternate endpoints when one endpoint is down. Thus, potential costs and inconveniences for all parties may be reduced.

System Architecture

FIG. 1 is a block diagram of an example system architecture 100 for providing network segmentation for secure network tunneling, in accordance with an embodiment. System architecture 100 (also referred to as "system" herein) includes private network 102, public network 106, VPN client device 150, and access control server 160, but may also include other devices and components not specifically shown in FIG. 1.

Various nodes are described with reference to FIG. 1. A node may be a physical computing device such as a personal computer (PC), a laptop computer, a notebook computer, a mobile phone, a smartphone, a tablet computer, a digital assistant, a rackmount server, a router computer, a network switch, or similar. An example computing device is further described with respect to FIG. 6. A node may also be a virtualized resource such as a virtual machine (VM) or a containerized application. For example, a node may correspond to cloud computing resources provisioned from a cloud computing provider. Other types of nodes are within the scope and spirit of the present disclosure. VPN client device 150, access control server 160, and nodes of private network 102 may correspond to the various example nodes given above.

Various nodes and networks described with reference to FIG. 1 may be connected by links. A link may be a physical connection between two or more nodes for transferring data, such as fiber or copper cables, wireless links, etc. A link may also refer to connections within a node, such as a PCIe bus or other system bus. A link may also refer to virtual connections and other virtual infrastructure such as virtual ethernet, VLANs, virtual bridges, etc. A link may also refer other layers, media, or protocols of the Open Systems Interconnection (OSI) model or other communication models. For example, a link may correspond to IP packets of the OSI network layer, TCP or UDP packets of the OSI transport layer, or similar. A link may also refer to an encapsulated link carried by another link, such as IP packets encapsulated in other IP packets, a VPN link, or other tunneling scheme. Other types of links are within the scope and spirit of the present disclosure. Links 170, 172A-n, 174A-n, 176A-n, and 178 may correspond to the various example links given above.

Public network 106 may be accessible to various users and support any suitable applications that may be run or accessed by users, or for various other purposes. Public network 106 may be the Internet, for example. Public network 106 may include various nodes and networks such as LANs, WANs, wired networks (e.g., Ethernet), wireless networks (e.g., an 802.11 Wi-Fi network), cellular network (e.g., a 5G network), routers, hubs, switches, server computers, VMs, or a combination thereof. Public network 106 or components thereof may be associated with different organizations in various embodiments. For example, components of public network 106 may be associated with Internet Service Providers (ISPs), mobile or cellular carriers, cloud platform or software-as-a-service (SaaS) providers, private or public enterprises, private households or communities, etc.

Private network 102 may be dedicated to a specific group of users (e.g., an entity) or configured for a specific purpose (s), e.g., streaming, gaming, and/or the like. Private network 102 may include multiple nodes, such as computers, routers, switches, or other devices connected to the network. Private network 102 may encompass one or more regions, such as regions 110, 120, 130, 140, and other regions not explicitly depicted in FIG. 1. Nodes of private network 102 may be located within (or associated with) the respective regions. A region may correspond to a geographical region, such as a continent, country, state/province, municipality, service region, economic region, availability zone, data center, or other location-oriented grouping. A region may correspond to a non-location-oriented grouping, such as a business unit within an entity (e.g., finance, marketing, IT, etc.), a security domain (e.g., high-security, low-security, and insecure), a subnet, a node type (e.g., computer, mobile, printer, etc.), or other grouping. In an embodiment, private network 102 may include nested regions (not depicted). For example, private network 102 may include multiple geographic regions corresponding to different continents and, within each geographic region, multiple availability zones corresponding to different data centers. In this example, regions 110 and 120 may be availability zones/data centers of a North American region, and regions 130 and 140 may be availability zones/data centers of a European region.

Regions 110 and 120 illustrate example regional network architectures (regional network architectures in regions 130 and 140 omitted). Regional network architectures may vary between regions or may be the same between regions in various embodiments. Region 110 includes router 112, VPN server 114, and one or more networks 116A-n. Region 120 includes router 122, VPN server 124, and one or more networks 126A-n. Other regions may include similar or different components. Components described hereinafter with reference to region 110 may apply to components of region 120 and other regions.

A network of a region may include one or more nodes of private network 102. For example, network 116A may include multiple server nodes (not depicted) in a data center, which may be networked together by network hardware of network 116A (e.g., switches, routers, etc. not depicted). In another example, network 116A may be a single computer. In yet another example, network 116A may include multiple VM nodes distributed across one or more physical nodes. A network of a region may host one or more network services of private network 102. For example, network 116A may host an SSH service, a configuration service (e.g., for provisioning and configuring cloud computing resources), a media streaming service, or various other services. A network of a region may be a subnet of the region. For example, network 116A may correspond to addresses 192.168.1.0/24 and network 116$n$ may correspond to addresses 192.168.2.0/24. A network of a region may also correspond to a set of ports, a set of network roles (e.g., administrator, developer, user, etc.), a set of network policies, and/or the like. Networks of regions may correspond to other purposes or subdivisions in various embodiments.

A router of a region may be a node that connects networks of a region to each other or to other regions of private network 102. For example, router 112 may route or switch packets between network 116A and network 116$n$ using links 174A-n. In another example, router 112 may route or switch packets between networks 116A-n and router 122 of region 120 using link 170. In an embodiment, link 170 may pass through public network 106 (not depicted). For example, routers 112 and 122 may be connected over the Internet (e.g., via BGP, VPN, etc.). Combinations of public and private routing may be used in various embodiments. In an embodiment, regions or their routers may correspond to a subnet of private network 102. For example, region 110 and router 112 may correspond to addresses 10.1.0.0/16 and region 120 and router 122 may correspond to addresses 10.2.0.0/16.

A VPN server of a region may be a node that connect networks of a region to one or more nodes external to private network 102, such as VPN client device 150. For example, VPN server 114 may expose a VPN endpoint to public network 106 via link 172A for VPN client device 150 to authenticate and connect. VPN server 114 may further route or switch packets from authenticated VPN client device 150 to networks 116A-n using links 176A-n (e.g., after carrier packets are stripped). VPN server 114 may perform various authentication protocols with VPN client device 150 or access control server 160 to authenticate VPN client device 150 prior to establishing a connection. VPN server 114 may further identify a subset of networks 116A-n for which VPN client device 150 has sufficient permission to access and may modify a firewall or other configuration of VPN server 114 to limit routing of VPN client device 150 packets to the permissible subset of networks. Authentication and permission protocols are further described with respect to access control server 160 and FIGS. 3 and 4. Links 172A-n are depicted as separately connecting to public network 106, which may correspond to various entry points to public network 106 (e.g., various ISPs) that may be geographically close (or otherwise close) to VPN client device 150. In an embodiment, private network 102 may have a single link or entry point to public network 106 for multiple VPN servers. For example, a router between VPN servers 114-124 and public network 106 may route VPN traffic to the proper region. In various embodiments, VPN server 114 may correspond to a tunneling endpoint for other (e.g., non-VPN) tunneling protocols.

While router 112 and VPN server 114 are depicted in FIG. 1 as distinct nodes with distinct links 174A-n and 176A-n to networks 116A-n, region 110 may have different architectures in various embodiments. In an embodiment, router 112 and VPN server 114 may be components of a single node. For example, router 112 and VPN server 114 may be different processes, applications, or VMs on a single node. Links 174A-n may connect to a first network interface and links 176A-n may connect to a second network interface. Alternatively, links 174A-n may correspond to a first VLAN and links 176A-n to a second VLAN of a shared network interface. Similarly, link 170 and links 172 may correspond to separate network interfaces or VLANs. Links which connect router 112 to public network 106 for routing purposes (e.g., BGP to other regions) may simultaneously be tunneling endpoints for VPN server 114. In an embodiment, VPN server 114 may be behind router 112, such that VPN traffic from VPN client device 150 passes through router 112 before reaching VPN server 114. VPN server 114, after stripping carrier packets from the client traffic, may route the client traffic directly to networks 116A-n (e.g., via routes 176A-n) or may pass the client traffic back to router 112 for routing to networks 116A-n (e.g., via routes 174A-n). In an embodiment, router 112 or VPN server 114 may be absent. For example, region 110 may be isolated from other regions (e.g., no router 112) or region 110 may be inaccessible to VPN client device 150 (e.g., no VPN server 114). In an embodiment, region 110 may have multiple routers 112 or multiple VPN servers 114. For example, additional routers and VPN servers may provide redundancy or load balancing.

In an embodiment, private network 102 may provide high-availability links between VPN servers and networks of different regions. High-availability links may serve as failover links for external nodes to access networks of a region when a VPN server for that region is unavailable. For example, networks of 126A-n of region 120 may be unreachable by VPN client device 150 via VPN server 124 due to VPN server 124 being down or link 172B being disrupted (e.g., due to network outage, BGP route leak, etc.). VPN client device 150 may, therefore, connect to VPN server 114 of region 110, which may forward traffic to router 122 via high-availability link 178 over router 112 and link 170. Router 122 may then route traffic to networks 126A-n. High-availability links may also enable external nodes to connect to networks in other regions for which the external nodes have permission (e.g., access privileges). For example, VPN client device 150 may have permission to access networks 116A and 126A. VPN client device 150 may connect to VPN server 114, which may directly route traffic to network 116A. Traffic for network 126A may be routed to router 122 via high-availability link 178. In an embodiment, high-availability links may be enabled for certain conditions. For example, high-availability link 178 may be enabled as a failover link when VPN server 124 is unavailable and may be disabled otherwise. In an embodiment, where multiple failover VPN servers and high-availability links are present (e.g., additional servers and links of regions 130 and 140 not depicted), a VPN server and high-availability link may be selected (e.g., by VPN client device 150 or by private network 102) based on various criteria. For example, the selection may be based on the latency of the high-availability link, the load on the VPN server, the proximity of other networks that VPN client device 150 has permission to access, or other criteria.

Failover scenarios may be transparent to VPN client device 150 or a user thereof, such that traffic is seamlessly routed to another VPN server and a high-availability link when the primary VPN server is unavailable.

VPN client device 150 may correspond to one or more client users associated with private network 102. For example, VPN client device 150 may be a computer of an employee of an employer entity associated with private network 102 and may be used by the employee to access private network 102 via VPN and use nodes, networks, and services of private network 102. VPN client device 150 may include one or more service clients 152A-n for connecting to private network 102 and services thereof. Service clients 152A-n may be hardware (e.g., circuitry, dedicated logic), software (e.g., an application, library, or framework), or a combination thereof in various embodiments. Example service clients include WireGuard and OpenVPN clients for connecting to private network 102, OpenSSH and PUTTY clients for SSH services hosted on private network 102, and web browsers for various web applications and websites hosted on private network 102. VPN client device 150 may include compliance agent 154 for ensuring that VPN client device 150 is compliant with one or more compliance profiles required for accessing private network 102 and nodes, networks, and services thereof. Compliance agent 154 may be or include a hardware component, a software component, or a combination thereof in various embodiments. Hardware and software compliance agents may provide various protections to prevent users from tampering with the compliance checking process. Examples of protections include integrity indicators to be sent with compliance indicators to access control server 160, integrity protocols and communication sequences with access control server 160 or other servers, and similar. Various examples are further described with respect to FIG. 3.

In an embodiment, compliance agent 154 may include an external hardware component that observes physical characteristics of VPN client device 150, provides compliance test signals to VPN client device 150, isolates compliance-related data (e.g., keys, software) from VPN client device 150, or performs other compliance-related activities. Examples of external hardware components include a USB token, a trusted platform module (TPM), or a specialized PCIe card. In an embodiment, compliance agent 154 may include a software component that observes activity of software and hardware systems of VPN client device 150 (e.g., available hardware, OS and application activity, filesystem contents), provides compliance test signals to VPN client device 150 (e.g., malware signatures), executes instructions to bring VPN client device 150 into compliance (e.g., changes configurations automatically), or performs other compliance-related activities. Examples of software components include compiled binaries, scripts, libraries, security components, etc.

Access control server 160 may provide access control and client compliance verification in relation to private network 102. For example, access control server 160 may receive compliance profiles or requirements from private network 102 (or associated entity) and may receive compliance information from VPN client device 150. Access control server 160 may issue access certificates for VPN servers of private network 102 if VPN client device 150 is compliant with the requirements of private network 102. Access certificates may further indicate which resources of private network 102 may be accessed. Access control server 160 may include secure enclave 162 to store signing key 164 or other data. Secure enclave may also perform secure operations such as signing access certificates with signing key 164, communicating with client devices for integrity protocols, etc. Secure enclaves and multi-purpose servers having secure enclaves are further described with reference to FIG. 5. Access control protocols are further described with reference to FIGS. 3 and 4.

Figure 2:
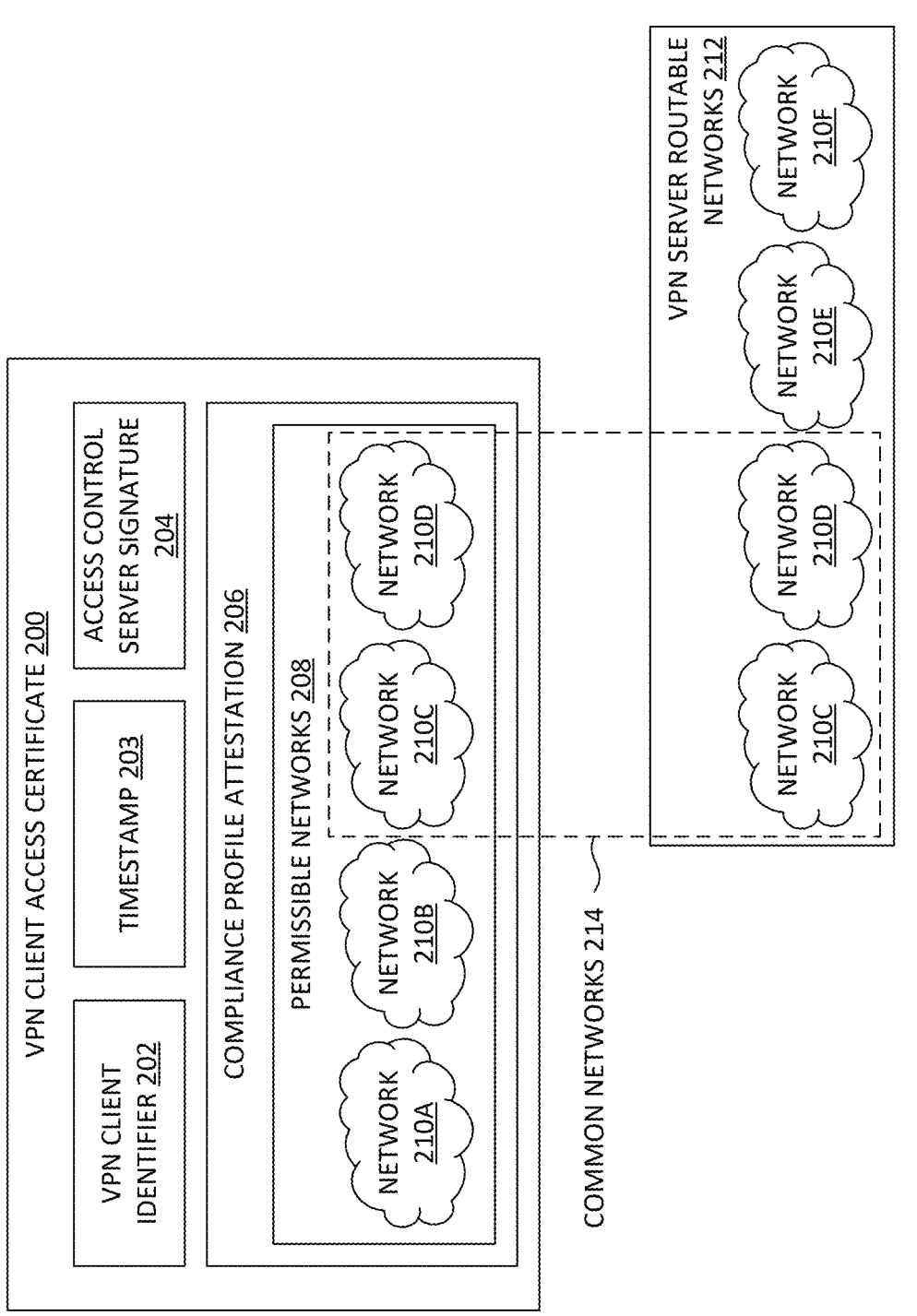
FIG. 2 is a block diagram of an example VPN client access certificate, in accordance with an embodiment.

FIG. 2 is a block diagram of an example VPN client access certificate 200 (also referred to as "access certificate" herein), in accordance with an embodiment. Access certificate 200 may be provided by an access control server (e.g., access control server 160) to a VPN client (e.g., VPN client device 150 or a VPN service client thereon), which may use access certificate 200 to connect to a VPN server of a private network (e.g., VPN server 114).

Access certificate 200 includes VPN client identifier 202, which may be or may include a cryptographic key, a hash, a unique name, or other data identifying the VPN client. For example, identifier 202 may be a public key of an asymmetric key pair used for connecting to a VPN server. In another example, identifier 202 may be a universally unique identifier (UUID) or other unique identifier generated by the VPN client or assigned by another entity/device. In another example, identifier 202 may be another cryptographic certificate or associated public key included in access certificate 200 to establish a chain of trusted certificates. Identifier 202 may include combinations of these and other identifiers in various embodiments.

Access certificate 200 includes timestamp 203 which may indicate a time that access certificate 200 was created (or signed, sent, etc.) or a time that access certificate 200 expires (e.g., may no longer be used for access to a private network). In some embodiments, both timestamps may be provided. Timestamps may be absolute or relative. For example, an absolute timestamp may be provided for a creation time, and a relative timestamp may be provided indicating the lifetime of access certificate 200. The expiration time can be determined by combining (e.g., adding) the two timestamps.

Access certificate 200 includes access control server signature 204, which may be a signature (e.g., using RSA, ECDSA, etc.) of the access control server that enables the VPN server to validate the authenticity of access certificate 200. Signature 204 may be associated with additional certificates and certificate authorities (CA) establishing a chain of trust under a trusted root CA. At least one CA in the chain (which may be the access control server) may be trusted by the VPN server.

Access certificate 200 includes compliance profile attestation 206 indicating that the VPN client complies with one or more compliance profiles for various purposes. Various indications may be provided in various embodiments. For example, attestation 206 may include names, identifiers, or specifications of compliance profiles for which the VPN client is compliant. In another example, attestation 206 may include specifications, compliance check results, or other characteristics of the VPN client corresponding to the requirements of the compliance profile(s). In another example, attestation 206 may include groups or permissions that are available to the VPN client based on the VPN client's compliance level, such as administrator or root groups/permissions. In yet another example, attestation 206 may identify services and other resources that the VPN client is permitted to access (e.g., as determined by the access control server) based on the VPN client's compliance level. Attestation 206 may include combination of these and other compliance indications in various embodiments.

Permissible networks 208 may correspond to the previous example of permissible resources indicated in attestation

206. Permissible networks 208 indicates subnetworks (e.g., networks 210A-D) of the private network (e.g., private network 102) that the VPN client is permitted to access. Networks 210A-D may correspond to networks in different regions of the private network. For example, networks 210A-B may correspond to networks 116A-B of region 110, and networks 210C-D may correspond to networks 126A-B in region 120. Some networks within a region may be excluded from permissible networks 208 (e.g., networks 116C-n and 126C-n). VPN server routable networks 212 corresponds to the networks within a region that can be routed to by the region's VPN server. For example, networks 210C-F may correspond to networks 126A-n of region 120 and may be routed to by VPN server 124. As further described with respect to FIGS. 3 and 4, upon receipt of access certificate 200, VPN server 124 may compare permissible networks 208 with routable networks 212 to identify common networks 214 (e.g., networks 210C-D corresponding to networks 126A-B) and provide the VPN client access to common networks 214.

In various embodiments, fields of access certificate 200 depicted in FIG. 2 may be absent, or access certificate 200 may include additional fields and information not depicted in FIG. 2. For example, additional identifiers, timestamps, signatures, or attestations may be included. Attestation 206 or other attestations may indicate other resources available to the client, such as services hosted within the private network. Thus, access certificate 200 may be multipurpose by providing a client device access to both a VPN server (for the client device's VPN service client) and a service within the private network (for the client device's, e.g., SSH service client). In an embodiment, access certificate 200 may be provided in a format or have fields expected by authentication modules or agents on the client side or the server side. For example, access certificate 200 may conform to an authentication data format of a service protocol (e.g., VPN, SSH) or an authentication protocol (e.g., ssh-agent, PAM).

Figure 3:
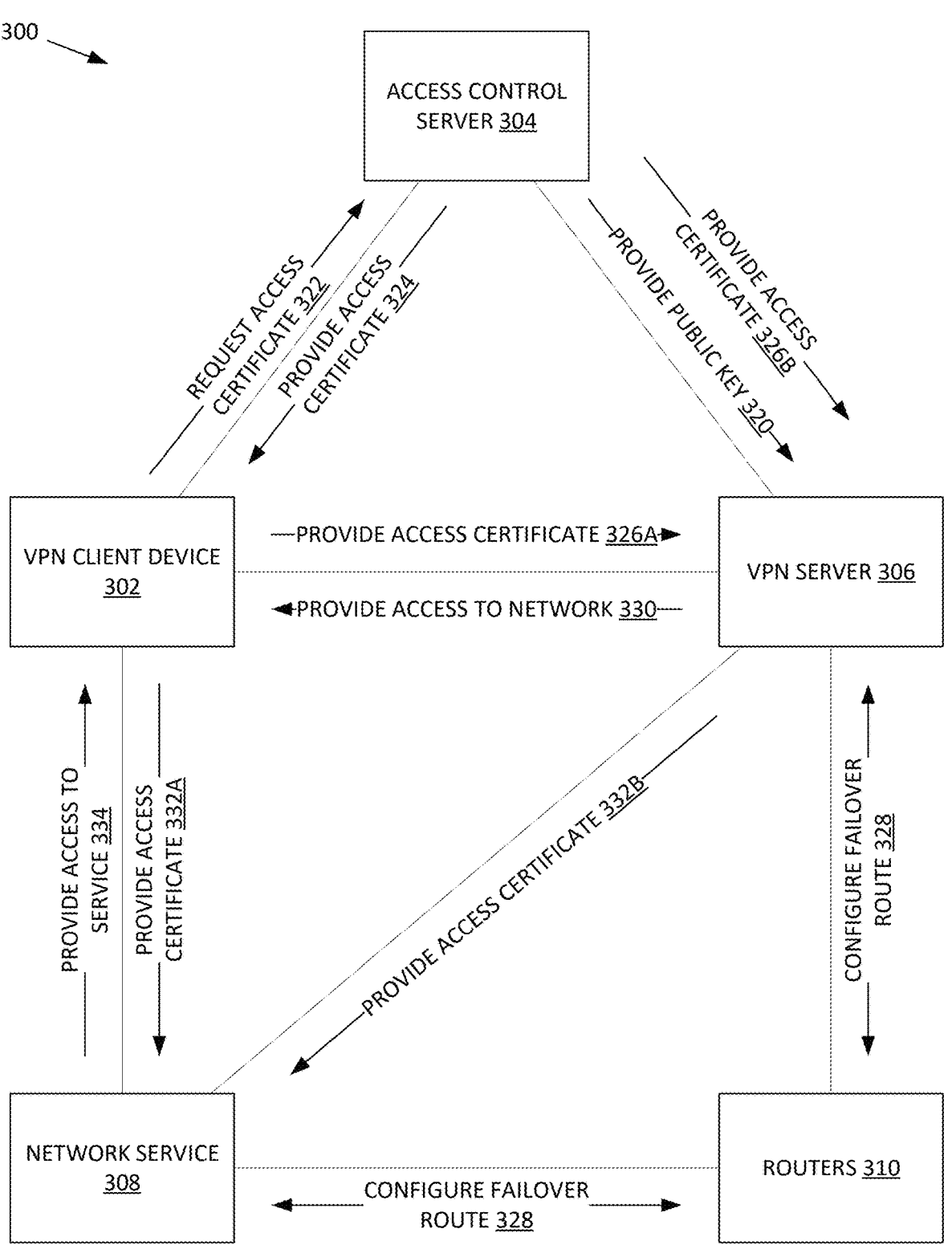
FIG. 3 is a communication diagram of an example interaction between devices for providing network segmentation for secure network tunneling, in accordance with an embodiment.

FIG. 3 is a communication diagram of an example interaction 300 between VPN client device 302, access control server 304, VPN server 306, network service 308, and routers 310 for providing network segmentation for secure network tunneling, in accordance with an embodiment. In an embodiment, VPN client device 302, access control server 304, and VPN server 306 correspond to VPN client device 150, access control server 160, and VPN server 114 of FIG. 1, respectively. Routers 310 correspond to routers 112 and 122. Network service 308 corresponds to a network service hosted on networks 116A-n or 126A-n. VPN server 306, network service 308, and routers 310 may be part of a private network (e.g., private network 102). In some embodiments, communications depicted in FIG. 3 could be performed in a different order or by different components than depicted. Various embodiments may include additional communications not depicted in FIG. 3 or a subset of communications depicted in FIG. 3. The communications depicted in FIG. 3 may correspond to different communication sessions or different timing intervals. For example, some communications may proceed in immediate succession or may be part of a single communication session, while other communications may be spread out over time or may be part of different communication sessions.

At communication 320, access control server 304 provides a public key to VPN server 306. The public key may correspond to a private key (e.g., signing key 164) of an asymmetrical cryptosystem (e.g., RSA, ECDSA). Access control server 304 may use the private key for generating digital signatures for access certificates, and VPN server 306 may use the public key for verifying access control server 304's signature. Access control server 304's public key may be signed by a mutually trusted certificate authority, or VPN server 306 may trust the public key implicitly (e.g., when both VPN server 306 and access control server 304 are part of the same entity or network). VPN server 306 may thus be able to identify a chain of trust for access certificates signed by access control server 304. In an embodiment, access control server 304 may provide its public key to VPN server 306 via an intermediary, such as by posting it on the Internet or by providing it to a repository of certificates/keys later accessed by VPN server 306. In an embodiment, the public key (or a certificate that includes the public key) may have limited lifetime (e.g., minutes, days, years, depending on the application). Thus, communication 320 may be performed again to deliver a new public key (or certificate) prior to expiration of the previous public key.

At communication 322, VPN client device 302 requests an access certificate from access control server 304 to access the private network via VPN server 306. The request may include one or more compliance indicators generated by a compliance agent (e.g., compliance agent 154). The compliance agent on VPN client device 302 may identify constituent compliance requirements of a compliance profile (e.g., provided by access control server 304 or VPN server 306) and may perform corresponding compliance checks on VPN client device 302. The compliance agent may generate one or more compliance indicators, which may correspond to results of individual compliance checks or individual compliance requirements of the profile. The indicators may be Boolean (e.g., pass/fail) or may be other data types. For example, the compliance indicator for an OS-version check may be a string or integer corresponding to the OS version number. In another example, the compliance indicator may include cryptographic evidence of compliance generated by a trusted platform module (TPM) or other cryptographic component of client device 408.

In an embodiment, the compliance agent or other software component of VPN client device 302 may receive one or more integrity indicators from access control server 304, VPN server 306, or other source, which may be used to verify the compliance agent or other compliance components. Thus, VPN client device 302 may ensure that a provider of compliance components or a user of VPN client device 302 has not modified or otherwise interfered with the function of the compliance agent/components. The integrity indicator(s) may be a control hash corresponding to a hashed value of a compliance component or associated binary. Various other types of integrity indicators may be provided. The integrity indicator(s) may be received prior to communication 322.

In an embodiment, the compliance agent may further generate the integrity indicators, which may be used by access control server 304 to verify that VPN client device 302 or the associated user did not interfere with or manipulate the compliance check process. For example, the compliance agent may calculate a hash of itself (e.g., of the compiled binary, script, etc.), which may be used by access control server 304 to verify that the agent has not been changed. In other examples, the compliance agent may use specialized hardware (e.g., an external security key, a secure enclave as described with respect to FIG. 5), additional communication sequences with access control server 304 or other components, or various other protocols to generate an integrity indicator. The integrity indicators may be provided to access control server 304 with the compliance indicator(s) in communication 322, or the integrity indicators may be provided in a separate communication. Other data may be included in the access certificate request in various embodiments, such as an identifier of the VPN client device (e.g., a public key to be used to connect to VPN server 306 or other service), an identifier of the VPN server or network service(s) to be connected to, timestamps, etc.

Other types of integrity protocols involving various integrity indicators generated and/or verified on a subset of devices 402-408 may be used in various embodiments.

Subsequent to receiving an access certificate request and compliance indicators from VPN client device 302 (e.g., in one request or in separate communications), access control server 304 may evaluate the compliance indicators to determine if the compliance requirements of the compliance profile are satisfied. Evaluating the compliance indicators may include observing a Boolean value (e.g., pass/fail), comparing a compliance indicator to a threshold value, double-checking the calculations performed by the compliance agent, or similar. In an embodiment, access control server 304 may also validate an included integrity indicator by, e.g., comparing a received hash to a known hash, checking a digital signature, performing a series of communications with VPN client device 302 in a validation protocol, or similar. These integrity validations may be performed by VPN client device 302 in other embodiments.

If access control server 304 determines that the compliance requirements of the compliance profile are satisfied, determines that the integrity indicator is valid, or makes other necessary determinations related to the access certificate request, access control server 304 may proceed to generate an access certificate for the accessing the private network (via VPN or other tunneling protocol). In an embodiment, the access certificate may be access certificate 200 of FIG. 2. The access certificate may include an indication that VPN client device 302 complies with the compliance requirements of the compliance profile. The indication may be a Boolean value (complies/does not comply), an identifier of the compliance profile (e.g., a unique identifier), a listing of the compliance requirements and associated compliance indicators, etc. The indication may also identify networks or other resources of the private network for which VPN client device 302 has permission to access. The access certificate may further include an identifier of the client, such as a unique identifier or a public key to be used for VPN access. The access certificate may further include one or more timestamps indicating a generation time and/or expiration time of the access certificate. Other data relevant to access control and other purposes may be included. The access certificate may include a digital signature of access control server 304, which may be generated using the private key associated with the public key provided in communication 320, such that the access certificate is verifiable by VPN server 306. As previously discussed, the digital signature included in the access certificate may be associated with a certificate provided by a trusted certificate authority (or a chain of such certificates), which may enable VPN server 306 to establish a chain of trust for the access certificate.

The generated access certificate may be a limited-duration access certificate valid up to the expiration time of the certificate. What is considered a limited-duration certificate may vary for different services and in different contexts. The lifetime of a limited-duration certificate may be determined by the frequency with which VPN client devices' compliance needs to be checked. For example, a limited-duration certificate may expire within a few minutes for a high-security service with frequent checks (e.g., a remote login service), a few hours for a medium-security service with somewhat frequent checks (e.g., a VPN service), and a few days for a low-security or non-security-focused service with infrequent checks (e.g., a web application). In an embodiment, the expiration time is determined by the service using a timestamp in the access certificate indicating creation/ generation time.

At communication 324, access control server 304 provides the access certificate to VPN client device 302. At communication 326A, VPN client device 302 provides the access certificate to VPN server 306 for accessing the private network. In an embodiment, access control server 304 provides the access certificate directly to VPN server 306 (e.g., communication 326B) or through another intermediary. Responsive to receiving the access certificate, VPN server 306 may verify the digital signature in the access certificate using the public key provided in communication 320 as previously discussed. VPN server 306 may further verify that the compliance indication in the certificate corresponds to the compliance profile needed to access subnetworks and other resources of the private network. Provider server 304 may further verify that the access certificate is active and not expired. Provider server 304 may perform other verifications as necessary in various embodiments. In an embodiment, subsequent to verifying that the compliance indication in the certificate corresponds to the compliance profile needed to access subnetworks and other resources of the private network, VPN server 306 may compare the set permissible networks indicated by the access certificate and the set of networks to which VPN server 306 can route traffic (e.g., the networks within the same region of the private network, such as networks 116A-n). VPN server 306 may determine a common set of networks including the overlapping networks between these two sets. Network service 308 may be hosted on the common networks in an embodiment (e.g., a subset of networks 116A-n).

In embodiment, network service 308 may be hosted on networks that VPN server 306 cannot route to (e.g., networks 126A-n) in some scenarios. For example, some of the permissible networks indicated in the access certificate may be in another region (e.g., region 120). In another example, the primary VPN server for the region hosting network service 308 may be down (e.g., VPN server 124), and VPN server 306 (e.g., VPN server 114) may be a backup VPN server. In one or more of these or other scenarios, the system may be configured to enable failover routes between regions through routers 310. At communications 328, VPN server 306 configures failover routes with routers 310 or network service 308 (e.g., via link 178 of FIG. 1).

At communication 330, VPN server 306 provides VPN client device 302 access to the private network and permissible networks/resources thereof (using failover routes if available and enabled). VPN server 306 may configure a firewall or other network settings to provide access to the permissible networks/resources and restrict access to impermissible networks/resources. VPN server 306 may periodically receive new access certificates demonstrating continued compliance before expiration of previous access certificates and may thus continue to allow access. If new access certificates indicate increased or decreased compliance (e.g., compliance corresponding to lesser, greater, or different compliance profiles), VPN server 306 may increase or restrict access to networks/resources of the private network as a result (e.g., by modifying the firewall or other configuration). If VPN client device 302 falls out of compliance or does not provide a new access certificate before expiration of a previous certificate, VPN server 306 may end access and close the tunnel with VPN client device 306.

At communication 332A, VPN client device 302 provides (over the secure tunnel, which may include a failover route) an access certificate to network service 308 for accessing the service. The access certificate may be the same certificate received from access control server 304 at communication 324 and provided to VPN server 306 at communication 326A/B for accessing the private network (e.g., a multipurpose access certificate), or the access certificate may be a separate certificate (which may be received from access control server 304 or another source). In an embodiment, VPN server 306 may provide a multipurpose access certificate received at communication 326A/B to network service 308 on VPN client device 302's behalf. Thus, VPN client device 302 may not have to provide the access certificate to access network service 308. In an embodiment, network service 308 may receive the access certificate from access control server 304 (not depicted). Network service 308 may receive a public key from access control server 304, VPN server 306, or other source for verifying the access certificate (not depicted). In an embodiment with a multipurpose access certificate as previously described, VPN server 306 may sign the multipurpose certificate with its own signing key, such that network service 308 can verify the multipurpose certificate with access control server 304's key or VPN server 306's key.

Responsive to receiving the access certificate, network service 308 may verify the digital signature(s) in the access certificate using the public key(s) previously described. Network service 308 may further verify that the compliance indication in the certificate corresponds to the compliance profile needed to access the service. Network service 308 may further verify that the access certificate is active and not expired. Network service 308 may perform other verifications as necessary in various embodiments and may then provide VPN client device 302 access to the service at communication 334.

Network service 308 may periodically receive new access certificates demonstrating continued compliance before expiration of previous access certificates and may thus continue to allow access. If new access certificates indicate increased or decreased compliance (e.g., compliance corresponding to lesser, greater, or different compliance profiles), Network service 308 may increase or restrict access to capabilities of the service as a result. If VPN client device 302 falls out of compliance or does not provide a new access certificate before expiration of a previous certificate, network service 308 may end access and close the connection with VPN client device 302. In some scenarios, VPN client device 302 may fall out of compliance with network service 308 while remaining in compliance with VPN server 306, such as if network service 308 has more rigorous access requirements. In these scenarios, VPN client device 302 may retain access to other resources on the common set of networks despite losing access to network service 308. In some scenarios, VPN client device 302 may fall out of compliance with VPN server 306 while remaining in compliance with network service 308. In these scenarios, VPN client device 302 may lose access to network service 308 if the updated common set of networks no longer includes network service 308.

FIG. 4 is a flow diagram of an example method 400 for providing network segmentation for secure network tunneling, in accordance with an embodiment. Method 400 may be performed by processing logic that may include hardware (e.g., circuitry, dedicated logic, etc.), computer-readable instructions such as software or firmware (e.g., run on a general-purpose computing system or a dedicated machine), or a combination thereof. For instance, an example system may include a memory and a processing device coupled to the memory device to perform operations comprising the blocks of method 400. Method 400 may also be associated with a set of instructions stored on a non-transitory computer-readable medium (e.g., magnetic or optical disk, etc.). The instructions, when executed by a processing device, may cause the processing device to perform operations comprising the blocks of method 400. In an embodiment, method 400 is performed by the system of FIG. 1 or components thereof (e.g., private network 102, router 112, VPN server 114, VPN client device 150, access control server 160). In an embodiment, method 400 is performed by computing system 600 of FIG. 6. In some embodiments, blocks depicted in FIG. 4 could be performed simultaneously or in a different order than depicted. Various embodiments may include additional blocks not depicted in FIG. 4 or a subset of blocks depicted in FIG. 4. For example, block 410 may be absent in an embodiment, as indicated by a dashed outline.

At block 402, processing logic of a first VPN server associated with a first set of one or more networks receives a request of a VPN client to connect to a second set of one or more networks wherein the request includes: an identifier of the VPN client, an attestation of an access control server that the VPN client complies with a compliance profile required to access the second set of one or more networks, and a digital signature of the access control server. The VPN client may be VPN clients 150 or 302 of FIGS. 1 and 3. The first VPN server may be VPN servers 114 or 306. The first VPN server may be one of a plurality of VPN servers (e.g., VPN servers 114, 124, etc.) of a plurality of regions. The plurality of regions may be regions 110, 120, 130, 140, etc. The networks of the first and second sets of networks may be networks of a plurality of networks (e.g., networks 116A-n, networks 126A-n, etc.) Each VPN server of the plurality of VPN servers may correspond to a subset of networks of the same region (e.g., VPN server 114 may correspond to networks 116A-n) or to a subset of networks of a different region or multiple regions (e.g., VPN server 114 may additionally correspond to networks 126A-n when a failover link is established between routers 112 and 122). The first set of one or more networks may be the corresponding networks of VPN servers 114 or 306 (e.g., networks 116A-n or networks 210C-F). The second set of one or more networks may be networks that the VPN client wants to connect to or that the VPN client has permission to connect to (e.g., networks 210A-D, as indicated in access certificate 200).

The request may include an access certificate generated by an access control server (e.g., access control servers 160 and 304). The access control server may generate the certificate in response to a request from the VPN client and subsequent compliance checking protocol (e.g., as described with respect to communications 322-324). The access certificate may be access certificate 200 and may include the identifier (e.g., identifier 202), attestation (e.g., attestation 206), and digital signature (e.g., signature 204) of the VPN client's request as described with respect to FIG. 2. For example, the identifier of the VPN client may be a public key of the VPN client used for establishing the VPN connection and encrypting the VPN traffic. The digital signature may be generated with a private key of the access control server (e.g., key 164). The request or access certificate may include other information such as timestamps, etc. In various embodiments, some of example fields described above may be omitted from the request or the access certificate.

At block 404, the processing logic validates the digital signature of the access control server using a public key of the access control server (e.g., a public key corresponding to key 164). The processing logic may further or alternatively use public keys and certificates of other trusted parties (e.g., root CAs) to validate the digital signature. The processing logic may perform other validations and verifications as described with respect to communication 324. In an embodiment, the processing logic of the first VPN server may be connected to the access control server to perform the validation. For example, the first VPN server may receive an updated key or other data from the access control server to validate the digital signature. In an embodiment, the processing logic of the first VPN server may be disconnected from the access control server while performing the validation. For example, the first VPN server may have received a key from the access control server during a past connection and uses the previously received key to perform validation while the access control server is presently disconnected.

At block 406, the processing logic identifies one or more common networks each included in both the first set of one or more networks and the second set of one or more networks. For example, the common networks may be common networks 214. In an embodiment, one or more networks of the second set of one or more networks that are absent from the first set of one or more networks are associated with a second VPN server of a second region of the plurality of regions. For example, a VPN client may have permission to access networks spread across two or more regions and their associated VPN servers (second set). The first VPN server may only provide access to networks in its region (first set) that overlap with the permissible networks (common set).

At block 408, the processing logic modifies a firewall of the first VPN server to permit the VPN client to connect to the one or more common networks. For example, the processing logic may generate firewall rules to perform stateful routing of traffic to and from the VPN client and common networks, to perform network address translation, or to perform other networking operations. The processing logic may perform other modifications related to the VPN configuration and other aspects of the network infrastructure to permit the VPN client to connect to the common networks.

At block 410, the processing logic modifies the firewall of the first VPN server to block the VPN client from connecting to one or more networks of the first set of one or more networks that are absent from the second set of one or more networks. For example, the processing logic may generate firewall rules to drop packets from the VPN client destined for networks of the second set of networks that the VPN client is not permitted to access. The processing logic may perform other modifications related to the VPN configuration and other aspects of the network infrastructure to block the VPN client from connecting to the networks of the first set that are not common networks. In an embodiment, blocks 408-410 may be combined. For example, the firewall may be set to block all by default (e.g., block 410), but may be modified to permit partial access to the one or more common networks (e.g., block 408). In another example, permitting access to the one or more common networks may correspond to permitting access to whitelisted ports, while blocking the networks of the first set that are absent from the second set may correspond to blocking blacklisted ports.

In an embodiment, the attestation of the access control server is a limited-duration attestation. For example, the attestation may have an expiration time of minutes, hours, days, etc. after it was generated. The processing logic may receive, prior to an expiration time of the limited-duration attestation, a second request of the VPN client to continue a connection to the second set (or common set) of one or more networks, the second request comprising: the identifier of the VPN client, an updated attestation of the access control server, and an updated digital signature of the access control server. The processing logic may validate the updated digital signature of the access control server using the public key of the access control server.

The updated attestation of the access control server may indicate that the VPN client complies with a second compliance profile required to access a subset of the second set of one or more networks. For example, the VPN client may have fallen out of compliance with the first compliance profile and reduced to the level of the second compliance profile, which permits access to some of the networks of the second set but not every network of the second set. The processing logic may identify an absent network of the one or more common networks that is absent from the subset of the second set of one or more networks. The absent network may be a network which the VPN client is no longer permitted to access due to reduced compliance as indicated by the second compliance profile. The processing logic may modify the firewall of the first VPN server (or other configurations, as previously described) to block the VPN client from connecting to the absent network.

In an embodiment, the first VPN server is associated with a first router (e.g., router 112), and a second VPN server (e.g., VPN server 224) is associated with a second router (e.g., router 122) corresponding to the first set of one or more networks. The first router and the second router communicate using BGP or routing other protocol (e.g., over link 170). The request of the VPN client (block 502) is a failover request received in response to the second VPN server being unreachable. To permit the VPN client to connect to the one or more common networks, the processing logic modifies the firewall of the first VPN server to forward traffic to the one or more common networks via the first router and the second router. (e.g., over failover link 178).

Computer Systems

FIG. 5 illustrates an example network server 500 with an access control service 530 for providing network segmentation for secure network tunneling, in accordance with an embodiment. Access control service 530 includes signing key 531, which may be used to digitally sign access certificates, and which may correspond to a public key used to verify access certificate signatures. In an embodiment, network server 500 running access control service 530 may correspond to access control server 160 of FIG. 1 or access control server 306 of FIG. 3. Signing key 531 may correspond to signing key 164 of FIG. 1.

As shown in FIG. 5, network server 500 may include processing device 510 that may execute operating system 520. Furthermore, processing device 510 may include one or more internal cryptographic keys 511 that may be used to encrypt and decrypt data stored in a portion of a memory that is assigned to a secure enclave of access control service 530. The access to the data of access control service 530 in the secure enclave (e.g., profiles, certificates, and keys stored at a storage resource) may be protected from one or more applications 540A-n and operating system 520. For example, the access to the data of the secure enclave corresponding to access control service 530 may be protected by the use of one of internal cryptographic keys 511 that are internal to processing device 510 so that the access to the data is based on a hardware access as opposed to a software access. Operating system 520 may be associated with a first privilege level and access control service 530 and applications 540A-n may be associated with a second privilege level where the first privilege level of the operating system is more privileged than the second privilege level of the various applications that are run on operating system 520 (e.g., the more privileged level allows access to more resources of the network server than the less privileged level). Thus, operating system 520 may be allowed access to resources of applications 540A-n. However, since access control service 530 is assigned to a secure enclave where access to the data of the secure enclave is based on the use of an internal cryptographic key 511 of processing device 510, operating system 520 may not be able to access the data of access control service 530 despite having a more privileged level of access than access control service 530. The master key that is used to decrypt data at the storage resource may be an internal cryptographic key 511.

In operation, a client device (e.g., VPN client device 150 of FIG. 1) may request an access certificate from access control service 530. Since access control service 530 is assigned to a secure enclave, the signing key or compliance profiles of access control service 530 may be encrypted and protected by the use of an internal cryptographic key 511 (i.e., the master key) of processing device 510. Access control service 530 may subsequently use an instruction so that processing device 510 may use one of its internal cryptographic keys 511 to decrypt the data of the secure enclave of access control service 530 and to retrieve the data. Subsequently, a cryptographic operation such as signing an access control certificate may then be performed by processing device 510 and then the output of the cryptographic operation may be provided to access control service 530 which may return the output the client device as a generated access certificate. In some embodiments, internal cryptographic key 511 may be combined with additional information (e.g., the identification information of access control service 530) to generate the master key for access control service 530 that is used to decrypt and/or encrypt data associated with the secure enclave of access control service 530. Thus, since processing device 510 uses its internal cryptographic key 511 to decrypt data and to perform the cryptographic operation, the signing key 531 and other access control-related data may not be exposed external to processing device 510. Network services (and associated administrators and organizations) may thus be assured that access certificates issued by access control service 530 have not been tampered with at network server 500 and may therefore trust access certificates received from client devices.

Figure 6:
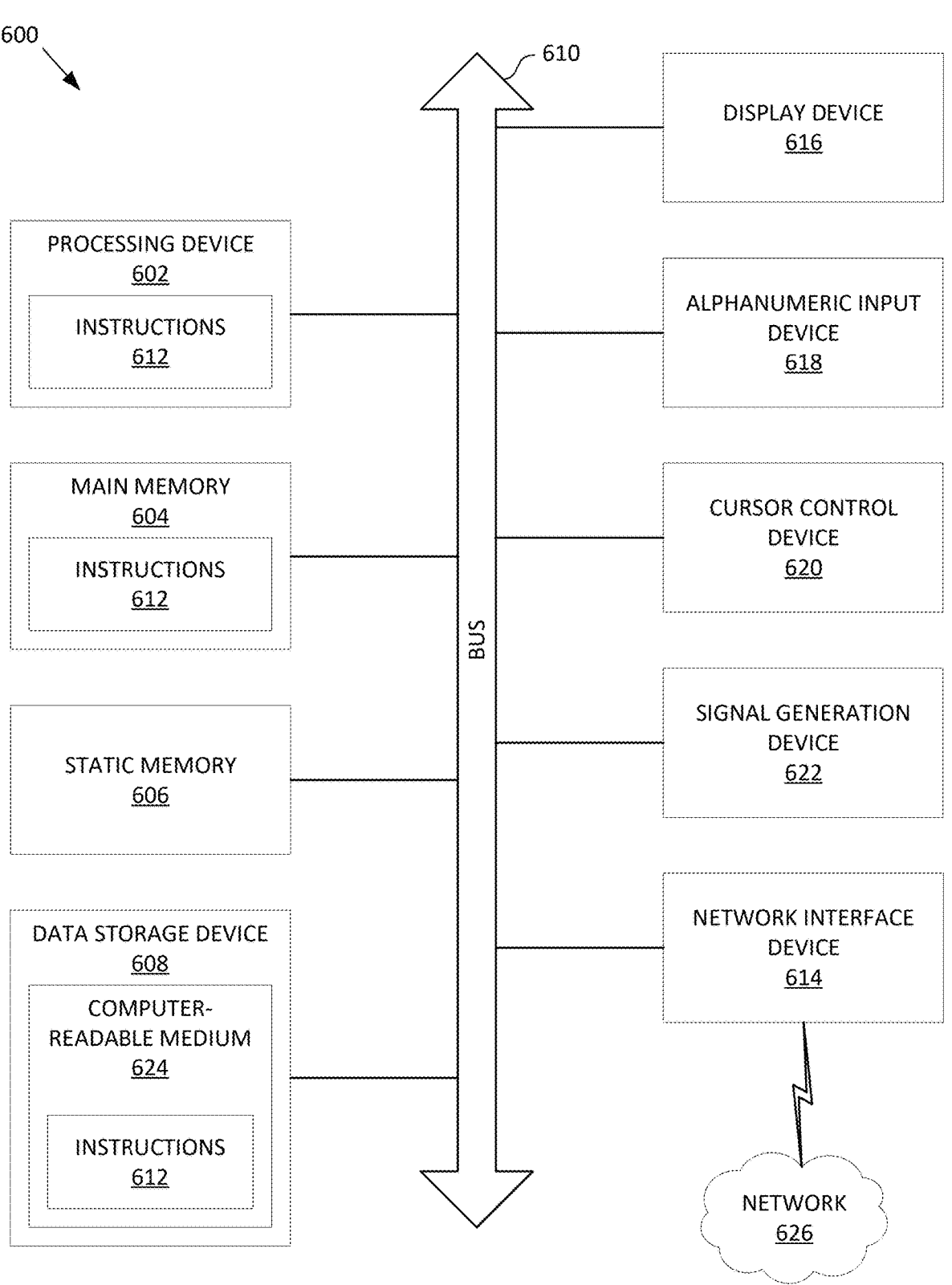
FIG. 6 illustrates an example computer system, in accordance with an embodiment.

FIG. 6 is a block diagram illustrating an example computer system 600, in accordance with implementations of the present disclosure. Computer system 600 may correspond to provider server 130, administrator device 140, client device 150, or access control server 160, as described with respect to FIG. 1. Computer system 600 may also correspond to network server 500, described with respect to FIG. 5. Computer system 600 may operate in the capacity of a server or an endpoint machine in endpoint-server network environment, or as a peer machine in a peer-to-peer (or distributed) network environment. The machine may be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Computer system 600 includes processing device 602 (e.g., one or more processors or cores), main memory 604 (e.g., read-only memory (ROM), flash memory, dynamic random access memory (DRAM) such as synchronous DRAM (SDRAM), double data rate (DDR SDRAM), or DRAM (RDRAM), etc.), static memory 606 (e.g., flash memory, static random access memory (SRAM), etc.), and data storage device 608, which communicate with each other via bus 610.

Processing device 602 represents one or more general-purpose processing devices such as a microprocessor, central processing unit, or the like. More particularly, processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute instructions 612 (e.g., for providing network segmentation for secure network tunneling) for performing the operations discussed herein.

Computer system 600 may further include network interface device 614. Computer system 600 also may include display device 616 (e.g., a liquid crystal display (LCD) or a cathode ray tube (CRT)), alphanumeric input device 618 (e.g., a keyboard, and alphanumeric keyboard, a motion sensing input device, touch screen), cursor control device 620 (e.g., a mouse), and signal generation device 622 (e.g., a speaker). In some embodiments, computer system 600 may not include display device 616, alphanumeric input device 618, and/or cursor control device 620 (e.g., in a headless configuration).

Data storage device 608 may include a non-transitory machine-readable storage medium 624 (also computer-readable storage medium) on which is stored one or more sets of instructions 612 (e.g., for providing network segmentation for secure network tunneling) embodying any one or more of the methodologies or functions described herein. Instructions 612 may also reside, completely or at least partially, within main memory 604 or within the processing device 602 during execution thereof by computer system 600, main memory 604 and processing device 602 also constituting machine-readable storage media. Instructions 612 may further be transmitted or received over network 626 via network interface device 614.

In one implementation, instructions 612 include instructions for providing network segmentation for secure network tunneling, as described herein. While computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing certain terms may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

As used in this application, the term "or" is intended to mean an inclusive "or" rather than an exclusive "or." That is, unless specified otherwise, or clear from context, "A or B" is intended to mean any of the natural inclusive permutations (e.g., A and B, A and not B, B and not A). In addition, the articles "a" and "an" as used in this application and the appended claims should generally be construed to mean "one or more" unless specified otherwise or clear from context to be directed to a singular form.

Furthermore, the terms "one implementation," "one embodiment," "an implementation," "an embodiment," or similar mean that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

What is claimed is:

1. A method comprising:

receiving, by a processing device of a first virtual private network (VPN) server associated with a first set of one or more networks, a request of a VPN client to connect to a second set of one or more networks, wherein the request comprises:

an identifier of the VPN client, an attestation of an access control server that the VPN client complies with a compliance profile required to access the second set of one or more networks, and a digital signature of the access control server;

validating the digital signature of the access control server using a public key of the access control server;

identifying one or more common networks each included in both the first set of one or more networks and the second set of one or more networks; and modifying a firewall of the first VPN server to permit the VPN client to connect to the one or more common networks.

2. The method of claim 1, further comprising:

modifying the firewall of the first VPN server to block the VPN client from connecting to one or more networks of the first set of one or more networks that are absent from the second set of one or more networks.

3. The method of claim 1, wherein the identifier of the VPN client is a public key of the VPN client.

4. The method of claim 1, wherein the attestation of the access control server is a limited-duration attestation, the method further comprising:

receiving, prior to an expiration time of the limited-duration attestation, a second request of the VPN client to continue a connection to the second set of one or more networks, the second request comprising:

the identifier of the VPN client, an updated attestation of the access control server, and an updated digital signature of the access control server; and validating the updated digital signature of the access control server using the public key of the access control server.

5. The method of claim 4, wherein the updated attestation of the access control server indicates that the VPN client complies with a second compliance profile required to access a subset of the second set of one or more networks, the method further comprising:

identifying an absent network of the one or more common networks that is absent from the subset of the second set of one or more networks; and modifying the firewall of the first VPN server to block the VPN client from connecting to the absent network.

6. The method of claim 1, wherein the first VPN server is associated with a first region of a plurality of regions, and wherein one or more networks of the second set of one or more networks that are absent from the first set of networks are associated with a second VPN server of a second region of the plurality of regions.

7. The method of claim 1, wherein the first VPN server is associated with a first router, wherein a second VPN server is associated with a second router corresponding to the first set of one or more networks, wherein the first router and the second router communicate using the Border Gateway Protocol (BGP), wherein the request of the VPN client is a failover request received in response to the second VPN server being unreachable, and wherein modifying the firewall of the first VPN server to permit the VPN client to connect to the one or more common networks further comprises:

modifying the firewall to forward traffic to the one or more common networks via the first router and the second router.

8. A system comprising:

a memory device; and a processing device coupled to the memory device, the processing device to perform operations comprising:

receiving, by a first virtual private network (VPN) server associated with a first set of one or more networks, a request of a VPN client to connect to a second set of one or more networks, wherein the request comprises:

an identifier of the VPN client, an attestation of an access control server that the VPN client complies with a compliance profile required to access the second set of one or more networks, and a digital signature of the access control server;

validating the digital signature of the access control server using a public key of the access control server;

identifying one or more common networks each included in both the first set of one or more networks and the second set of one or more networks; and modifying a firewall of the first VPN server to permit the VPN client to connect to the one or more common networks.

9. The system of claim 8, the operations further comprising:

modifying the firewall of the first VPN server to block the VPN client from connecting to one or more networks of the first set of one or more networks that are absent from the second set of one or more networks.

10. The system of claim 8, wherein the identifier of the VPN client is a public key of the VPN client.

11. The system of claim 8, wherein the attestation of the access control server is a limited-duration attestation, the operations further comprising:

receiving, prior to an expiration time of the limited-duration attestation, a second request of the VPN client to continue a connection to the second set of one or more networks, the second request comprising:

the identifier of the VPN client, an updated attestation of the access control server, and an updated digital signature of the access control server; and validating the updated digital signature of the access control server using the public key of the access control server.

12. The system of claim 11, wherein the updated attestation of the access control server indicates that the VPN client complies with a second compliance profile required to access a subset of the second set of one or more networks, the operations further comprising:

identifying an absent network of the one or more common networks that is absent from the subset of the second set of one or more networks; and modifying the firewall of the first VPN server to block the VPN client from connecting to the absent network.

13. The system of claim 8, wherein the first VPN server is associated with a first region of a plurality of regions, and wherein one or more networks of the second set of one or more networks that are absent from the first set of one or more networks are associated with a second VPN server of a second region of the plurality of regions.

14. The system of claim 8, wherein the first VPN server is associated with a first router, wherein a second VPN server is associated with a second router corresponding to the first set of one or more networks, wherein the first router and the second router communicate using the Border Gateway Protocol (BGP), wherein the request of the VPN client is a failover request received in response to the second VPN server being unreachable, and wherein modifying the firewall of the first VPN server to permit the VPN client to connect to the one or more common networks further comprises:

modifying the firewall to forward traffic to the one or more common networks via the first router and the second router.

15. A non-transitory computer-readable medium comprising instructions that, when executed by a processing device, cause the processing device to perform operations comprising:

receiving, by a first virtual private network (VPN) server associated with a first set of one or more networks, a request of a VPN client to connect to a second set of one or more networks, wherein the request comprises:

an identifier of the VPN client, an attestation of an access control server that the VPN client complies with a compliance profile required to access the second set of one or more networks, and a digital signature of the access control server;

validating the digital signature of the access control server using a public key of the access control server;

identifying one or more common networks each included in both the first set of one or more networks and the second set of one or more networks; and modifying a firewall of the first VPN server to permit the VPN client to connect to the one or more common networks.

16. The non-transitory computer-readable medium of claim 15, the operations further comprising:

modifying the firewall of the first VPN server to block the VPN client from connecting to one or more networks of the first set of one or more networks that are absent from the second set of one or more networks.

17. The non-transitory computer-readable medium of claim 15, wherein the identifier of the VPN client is a public key of the VPN client.

18. The non-transitory computer-readable medium of claim 15, wherein the attestation of the access control server is a limited-duration attestation, the operations further comprising:

receiving, prior to an expiration time of the limited-duration attestation, a second request of the VPN client to continue a connection to the second set of one or more networks, the second request comprising:

the identifier of the VPN client, an updated attestation of the access control server, and an updated digital signature of the access control server; and validating the updated digital signature of the access control server using the public key of the access control server.

19. The non-transitory computer-readable medium of claim 18, wherein the updated attestation of the access control server indicates that the VPN client complies with a second compliance profile required to access a subset of the second set of one or more networks, the operations further comprising:

identifying an absent network of the one or more common networks that is absent from the subset of the second set of one or more networks; and modifying the firewall of the first VPN server to block the VPN client from connecting to the absent network.

20. The non-transitory computer-readable medium of claim 15, wherein the first VPN server is associated with a first region of a plurality of regions, and wherein one or more networks of the second set of one or more networks that are absent from the first set of one or more networks are associated with a second VPN server of a second region of the plurality of regions.

* * * * *